(12) United States Patent
Charrier et al.

(10) Patent No.: US 6,727,488 B2
(45) Date of Patent: Apr. 27, 2004

(54) PHOTORECEPTOR CIRCUIT SWITCHABLE BETWEEN OPERATING MODES

(75) Inventors: Pierre Charrier, Migne-Auxances (FR); Alain Guillot, Fleac (FR)

(73) Assignee: Schneider Electric Industries SA (FR)

( * ) Notice: Subject to any disclaimer, the term of this patent is extended or adjusted under 35 U.S.C. 154(b) by 229 days.

(21) Appl. No.: 09/888,515

(22) Filed: Jun. 26, 2001

(65) Prior Publication Data

US 2001/0054679 A1 Dec. 27, 2001

(30) Foreign Application Priority Data

Jun. 26, 2000 (FR) .............................................. 00 08280

(51) Int. Cl.$^7$ ................................................ H01J 40/14
(52) U.S. Cl. .................................. 250/214 R; 250/221
(58) Field of Search .................... 250/214 R, 559.38, 250/221, 222.1; 209/580

(56) References Cited

U.S. PATENT DOCUMENTS 6,355,924 B2 * 3/2002 Even et al. ............. 250/214 R
6,384,403 B1 * 5/2002 Guillot et al. .............. 250/226

FOREIGN PATENT DOCUMENTS

| DE | 199 17 487 | 11/1999 |
| EP | 0 923 140 | 6/1999 |
| FR | 2 787 589 | 6/2000 |
| FR | 2 792 732 | 10/2000 |

* cited by examiner

Primary Examiner—Stephone Allen
(74) Attorney, Agent, or Firm—Parkhurst & Wendel, L.L.P.

(57) ABSTRACT

Photoreceptor circuit provided with a component, the photoreceptor surface comprising a first area able to operate in reflex mode and a second area with analog detection of position able to operate in proximity mode.

Figure 1:
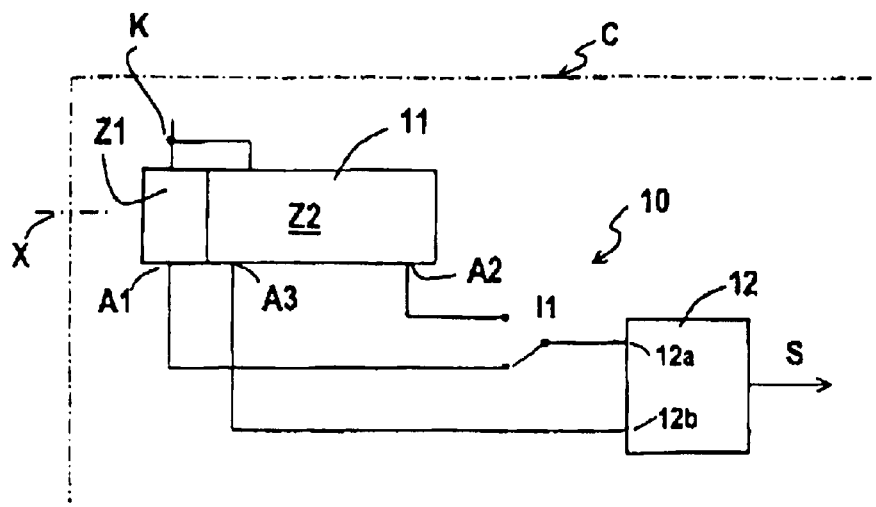

The first area Z1 is a photodiode area with an output A1 and the second area Z2 is a PSD type area provided with a close output A2 and a remote output A3, wherein a switch I1 connects either the A1 output in reflex mode or output A2 in proximity mode, to a processing circuit 12.

2 Claims, 1 Drawing Sheet

PHOTORECEPTOR CIRCUIT SWITCHABLE BETWEEN OPERATING MODES

The present invention relates to a photoelectric cell including an optoelectronic receptor circuit provided with a photoreceptor component, the photoreceptor surface of which is able to receive a spot of light, and comprises a first photoreceptor area and a second photoreceptor area, wherein both areas are juxtaposed.

As it is known, a photoelectric cell of the "reflex" type emits a light beam towards a reflector and detects an object by interruption of the reflected light beam. A photoelectric cell of the "proximity" type emits a light beam towards the object to be detected and for triangulation purposes makes use of the light beam reflected by the object in order to determine whether the distance is smaller or larger than a distance called the detection range. A photoelectric cell which may operate in reflex mode or in proximity mode, is described in document EP 923 140. The receiving portion of this cell has several optically sensitive areas connected to a processing circuit via switches which enable the operating mode of the cell to be selected. The considered areas are photodiode areas, certain of which may be enabled by means of the switches.

Sometimes there is the risk, notably with poorly reflecting targets located at a relatively large distance, that the signal to noise ratio of the cell may be too low.

The object of the invention is to improve for certain applications, the photoreceptor portion of a cell which may be used both in reflex mode and proximity mode.

According to the invention,
the photoreceptor surface of the component has two juxtaposed photoreceptor areas, wherein these areas differ by their microelectronic nature,
the cell has means for assigning the photoreceptor circuit to a reflex operating mode or to a proximity operating mode,
the first photoreceptor area is provided with a first output enabled in the reflex operating mode,
the second area is with analog detection of the position of the spot of light and is provided with a second output enabled in the proximity operating mode.

The area for analog detection of position has a third output which is enabled in the proximity operating mode and which may either be distinct from the first output, or may coincide with the first output. The first area is preferably a photodiode area.

The second output then forms the close channel, and the third output forms the remote channel, respectively, of the analog area for the detection of position, wherein the first and second outputs may be switched one exclusively from the other, to a processing circuit by means of an operating mode selection switch, which forms the mode assigning means. The component is then a component with three outputs and has a cathode common to the two areas.

The description of a non-limiting embodiment of the invention will be made hereafter, with reference to the appended drawings.

FIG. 1 schematically illustrates an embodiment of the photoreceptor circuit of a cell according to the invention.

Figure 2:
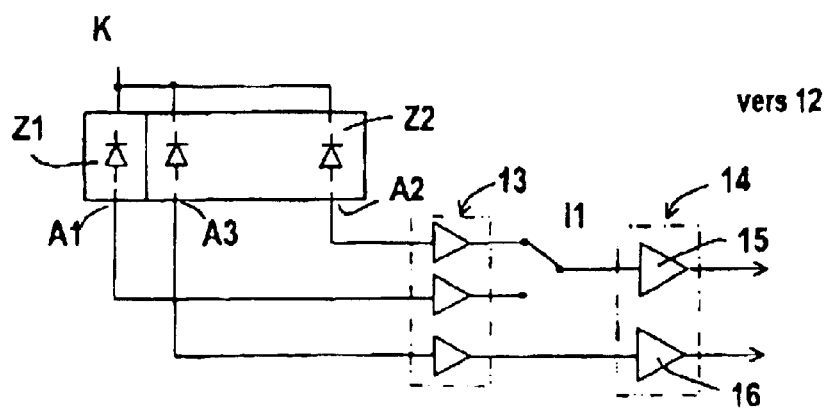

FIG. 2 is another diagram of the circuit of FIG. 1.

The opto-electronic receptor circuit 10 illustrated in FIG. 1 belongs to a photoelectric cell C and comprises a photoreceptor component 11 connected to a processing circuit 12 which is intended for providing a signal S for the presence of an object. The emitting portion of cell C is not illustrated here.

The component 11 is a chip including a rectangular or substantially square area Z1 and a rectangular adjacent area Z2 juxtaposed with Z1 in a direction X, longer than Z1 and of the same width as Z1. It may also be of a different width. In this embodiment, areas Z1 and Z2 differ by their microelectronic nature, whereby area Z1 of component 11 is laid out as a photodiode, whereas area Z2 of the component is laid out as an area for analog detection of position, for example of the analog or PSD type.

The photodiode area Z1 operates by delivering on a channel connected to anode A1, a current substantially proportional to the received intensity. The area Z2 with analog detection of position is able, upon receiving a spot of light, the position of which is variable with the distance of the target, to provide on both channels, i.e., a "close" channel and a "remote" channel, respective analog signals, the variation of which serves as a basis for a comparison leading to the determination of the target's distance. Area Z2 for this purpose comprises, towards its ends along the X direction, an anode A2 serving as a "close" terminal and an anode A3 serving as a "remote" terminal. Areas Z1 and Z2 have a common cathode K. Differentiation of areas Z1 and Z2 is achieved by any usual means in semiconductor technology.

Either of anodes A1 and A2 is connected to an input 12a of circuit 12 via a local or remote, hand or automatic control switch I1, whereas anode A3 is permanently connected to another input 12b of circuit 12.

In the position shown in FIG. 1, switch I1 enables anode A1 and disables anode A2, so that the cell is configured in reflex mode. In the position shown in Fog. 2, switch I1 disables anode A1 and enables anode A2, so that the cell is configured in proximity mode. On the other hand, the diagram of FIG. 2 illustrates the connection of anode A1, A2 and A3 with circuit 12 through a preamplifier stage 13 and through an amplifier stage 14; stage 14 comprises an amplifier 15 downstream from switch I1 and an amplifier 16 on the connection of A1 with circuit 12. In reflex mode, area Z1 (anode A1) is enabled, area Z2 (anodes A2, A3) is (are) disabled. In proximity mode, area Z1 (anode A1) is disabled and area Z2 (anodes A2, A3) is (are) enabled.

What is claimed is:

1. A photoelectric cell comprising:
    a photoreceptor circuit including a photoreceptor component having a photoreceptor area surface for receiving light; and
    a switch for assigning the photoreceptor circuit to a reflex operating mode or to a proximity operating mode, wherein:
        the photoreceptor surface comprises two juxtaposed photoreceptor areas each having differing microelectronic structures,
        the first photoreceptor area comprises a photodiode area and a first output for operating in the reflex operating mode,
        the second photoreceptor area comprises means for analog detection of position of a spot of light, a second output for operating in the proximity operating mode, and a third output, wherein
            the second output is a closed channel, and the third output is a remote channel of the second photoreceptor area for analog detection of position, said closed and remote channels for output of signals corresponding to relative distances to a target represented by a detected position of a spot of light, and
            the switch is for switching the first and second outputs to a processing circuit.

2. The cell according to claim 1, wherein both said photoreceptiv areas have a common cathode.

* * * * *